US012781681B2

(12) United States Patent
Nakamura

(10) Patent No.: US 12,781,681 B2
(45) Date of Patent: Nov. 3, 2026

(54) EXHAUST MONITORING SYSTEM AND EXHAUST MONITORING METHOD

(71) Applicant: TOYOTA JIDOSHA KABUSHIKI KAISHA, Toyota (JP)

(72) Inventor: Yoshitaka Nakamura, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/277,440

(22) Filed: Jul. 23, 2025

(65) Prior Publication Data

US 2026/0055736 A1 Feb. 26, 2026

(30) Foreign Application Priority Data

Aug. 21, 2024 (JP) ................................ 2024-139908

(51) Int. Cl.
*F02D 41/14* (2006.01)
*F01N 11/00* (2006.01)
*F02D 41/02* (2006.01)

(52) U.S. Cl.
CPC ............ *F02D 41/146* (2013.01); *F01N 11/00* (2013.01); *F02D 41/021* (2013.01); *F01N 2560/026* (2013.01); *F01N 2900/0416* (2013.01)

(58) Field of Classification Search
CPC .. F02D 41/146; F02D 41/021; F02D 41/1461; F02D 2041/228; F01N 11/00;
(Continued)

(56) References Cited

U.S. PATENT DOCUMENTS

2012/0046814 A1* 2/2012 Sugimoto ............... F02D 41/22
903/903
2014/0167944 A1* 6/2014 Yamaguchi ............ B60K 35/60
340/439

(Continued)

FOREIGN PATENT DOCUMENTS

DE 102011103699 A1 12/2012
JP 2023-008849 A 1/2023

OTHER PUBLICATIONS

Acts Adopted By Bodies Created By International Agreements, Regulation No. 83 of the Economic Commission for Europe of the United Nations (UNECE)—Uniform provisions concerning the approval of vehicles with regard to the emission of pollutants according to engine fuel requirements [2015/1038], http://www.unece.org/trans/main/wp29/wp29wgs/wp29gen/wp29fdocstts.html, Jul. 3, 2015, pp. 1-249, the Economic Commission for Europe of the United Nations (UNECE).

*Primary Examiner* — Hoang M Nguyen

(57) ABSTRACT

The exhaust monitoring system includes an exhaust purification device that purifies exhaust gas discharged from the engine, a first sensor that detects an amount of nitrogen oxides contained in exhaust gas that has passed through the exhaust purification device, a display device that presents information to a vehicle user, and a management device. The management device determines that an abnormality has occurred in a component contained in the exhaust gas when the first sensor detects nitrogen oxide in an amount greater than or equal to a threshold. In the exhaust monitoring system, the management device displays a drivable distance remaining until a distance traveled from when the abnormality is determined to have occurred reaches a predetermined distance, on the display device. When the engine is stopped with zero drivable distance, the management device
(Continued)

prohibits the start of the engine even if an operation for starting the engine is performed.

6 Claims, 4 Drawing Sheets

(58) Field of Classification Search
CPC ....... F01N 2560/026; F01N 2900/0416; F01N 2900/10; F01N 2900/102
See application file for complete search history.

(56) References Cited

U.S. PATENT DOCUMENTS

| | | | | |
|---|---|---|---|---|
| 2014/0277904 | A1 | 9/2014 | Schankula et al. | |
| 2015/0226105 | A1* | 8/2015 | Hagiwara | F01N 11/007 73/114.75 |
| 2021/0215078 | A1* | 7/2021 | Hirooka | F01N 3/2026 |
| 2023/0003163 | A1 | 1/2023 | Stenqvist et al. | |

* cited by examiner

Fig.4

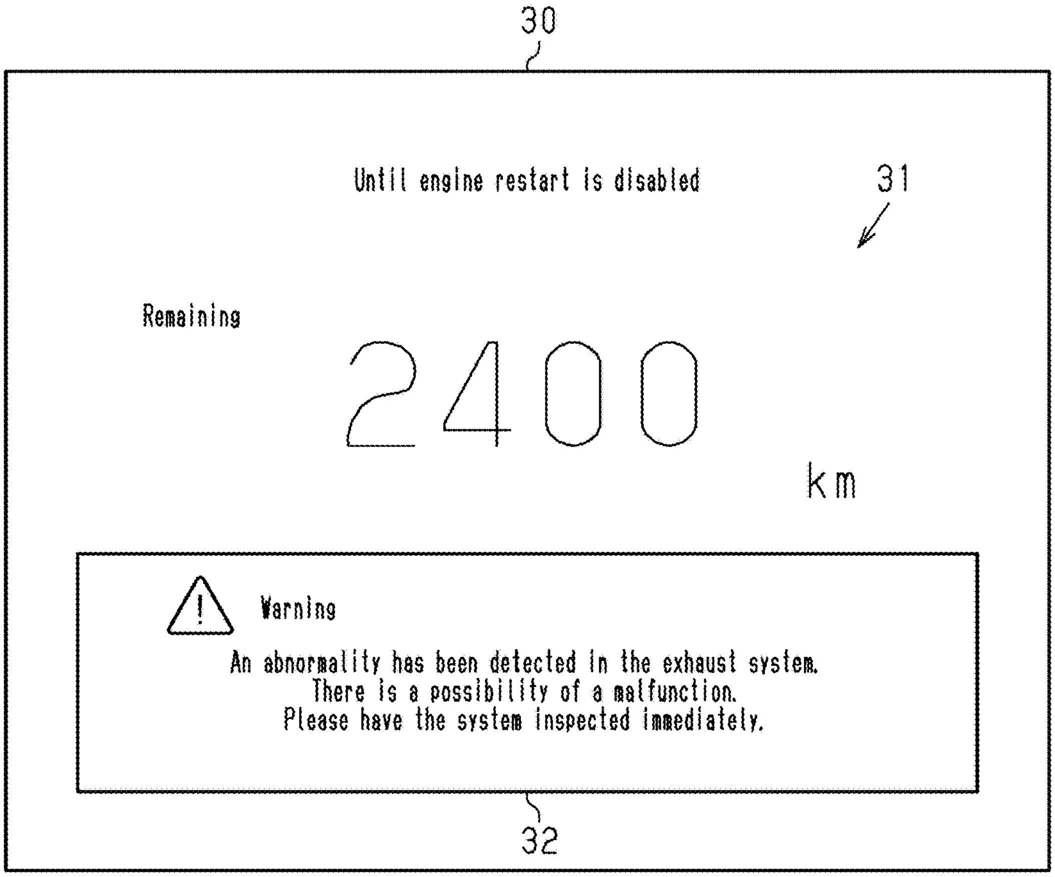

Fig.5

| Type of Warning Display Mode | Displayed Information |
| --- | --- |
| First Display Mode | ·Display drivable distance<br>·Message prompting repair (first stage) |
| Second Display Mode | ·Display drivable distance<br>·Message prompting repair (second stage) |
| Third Display Mode | ·Display drivable distance<br>·Message prompting repair (third stage) |
| Fourth Display Mode | ·Message prompting repair (fourth stage) |

EXHAUST MONITORING SYSTEM AND EXHAUST MONITORING METHOD

CROSS-REFERENCE TO RELATED APPLICATIONS

This application is based upon and claims the benefit of priority from Japanese Patent Application No. 2024-139908, filed on Aug. 21, 2024, the entire contents of which are incorporated herein by reference.

BACKGROUND

1. Field

The present disclosure relates to an exhaust monitoring system and an exhaust monitoring method.

2. Description of Related Art

Japanese Laid-Open Patent Publication No. 2023-8849 discloses an exhaust monitoring system. This exhaust monitoring system measures the amount of nitrogen oxides (NOx) contained in the exhaust gas of the engine.

The exhaust gas from the engine contains NOx and particulate matter (PM). The engine has an exhaust passage provided with an exhaust purification device. The exhaust gas from the engine is purified by the exhaust purification device. Thus, the discharge of NOx and PM is limited. When an abnormality occurs in a component contained in the exhaust gas due to a factor such as an abnormality in the exhaust purification device, it is desirable to limit the discharge of the exhaust gas in which the abnormality has occurred in the component as soon as possible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure provides an exhaust monitoring system for a vehicle including an engine. The exhaust monitoring system includes an exhaust purification device configured to purify exhaust gas discharged from the engine, a first sensor configured to detect an amount of nitrogen oxide contained in the exhaust gas that has passed through the exhaust purification device, a display device configured to present information to a user of the vehicle, and a management device. The management device is configured to determine that an abnormality has occurred in a component contained in the exhaust gas when the first sensor detects the nitrogen oxide in an amount greater than or equal to a threshold, display a drivable distance on the display device, the drivable distance being a remaining distance until a distance traveled from when the abnormality is determined to have occurred reaches a predetermined distance, and, when the engine is stopped in a state in which the drivable distance is zero, prohibit the engine from being started even if an operation for starting the engine is performed.

The above-described exhaust monitoring system can prompt the user to repair the vehicle as soon as possible when the amount of nitrogen oxides contained in the exhaust gas is abnormal. Further, if the user ignores the notification and continues to use the vehicle without repair, the above-described exhaust monitoring system can prevent the engine from being restarted to prevent the exhaust gas from being discharged from the vehicle.

Another aspect of the present disclosure provides an exhaust monitoring method for a vehicle including an engine. The exhaust monitoring system includes an exhaust purification device configured to purify exhaust gas discharged from the engine, a first sensor configured to detect an amount of nitrogen oxide contained in the exhaust gas that has passed through the exhaust purification device, a display device configured to present information to a user of the vehicle, and a management device. The method includes determining that an abnormality has occurred in a component contained in the exhaust gas when the first sensor detects the nitrogen oxide in an amount greater than or equal to a threshold, displaying a drivable distance on the display device, the drivable distance being a remaining distance until a distance traveled from when the abnormality is determined to have occurred reaches a predetermined distance, and, when the engine is stopped in a state in which the drivable distance is zero, prohibiting the engine from being started even if an operation for starting the engine is performed.

BRIEF DESCRIPTION OF DRAWINGS

FIG. 4 is an example of an image displayed on the display device by the exhaust monitoring system shown in FIG. 1.

FIG. 5 is a table showing transition of images displayed on the display device by the exhaust monitoring system shown in FIG. 1.

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

Hereinafter, an embodiment of an exhaust monitoring system will be described with reference to FIGS. 1 to 6.

Configuration of Exhaust Monitoring System 100

Figure 1:
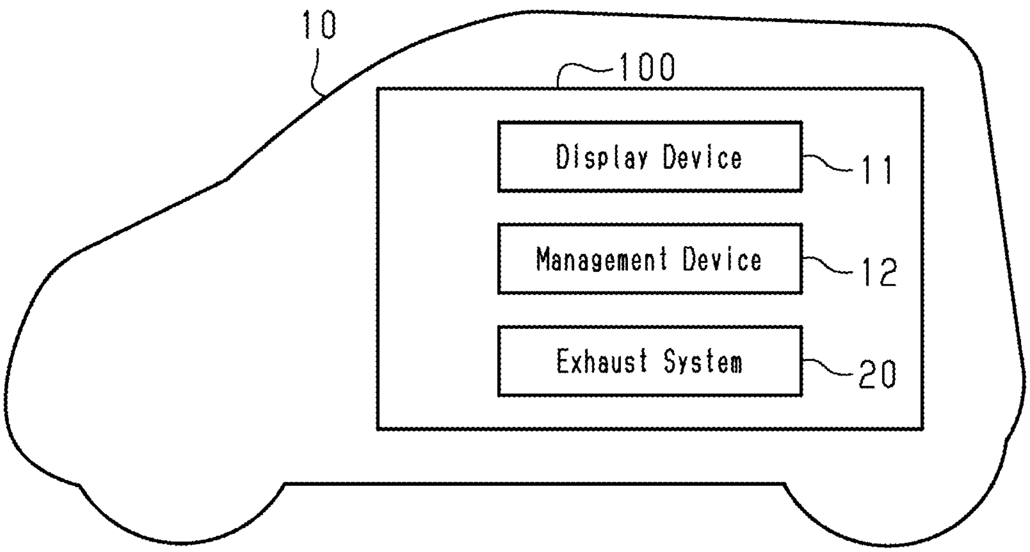
FIG. 1 is a schematic diagram showing a configuration of an exhaust monitoring system according to an embodiment.

As shown in FIG. 1, the exhaust monitoring system 100 is applied to a vehicle 10. The exhaust monitoring system 100 includes a display device 11, a management device 12, and an exhaust system 20.

The display device 11 includes a screen for displaying an image. The display device 11 presents information to the user of the vehicle 10 by displaying an image on a screen. The display device 11 is, for example, a monitor that displays a speedometer in the vehicle 10. The display device 11 may be a head-up display. The display device 11 may be a monitor of a car navigation system or a display audio. The display device 11 may be a multi-information display provided on a meter panel.

Figure 2:
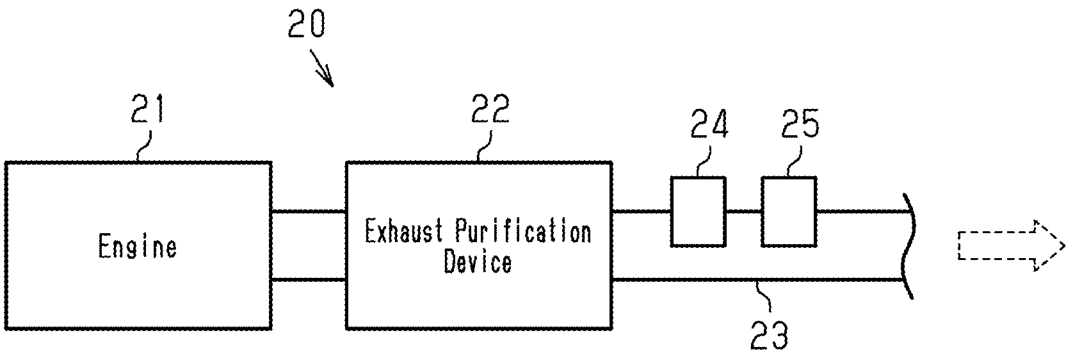
FIG. 2 is a schematic diagram showing a configuration of an exhaust system included in the exhaust monitoring system shown in FIG. 1.

As shown in FIG. 2, the exhaust system 20 includes an engine 21, an exhaust purification device 22, an exhaust pipe 23, a first sensor 24, and a second sensor 25. The exhaust system 20 is a mechanism that discharges exhaust gas discharged by the engine 21 to the outside of the vehicle 10.

The engine 21 is a diesel engine.

The exhaust pipe 23 is connected to a combustion chamber of the engine 21. The exhaust pipe 23 is connected to the outside of the vehicle 10 at the tip of the dotted arrow in FIG. 2. The exhaust gas discharged from the engine 21 flows through the exhaust pipe 23 in the direction indicated by the dotted arrow in FIG. 2. The exhaust gas is discharged to the outside of the vehicle 10 through the exhaust pipe 23.

As shown in FIG. 2, the exhaust purification device 22 is installed in a portion of the exhaust pipe 23 through which exhaust gas passes. The exhaust purification device 22 purifies the exhaust gas discharged from the engine 21. The exhaust gas is purified by passing through the exhaust purification device 22.

The exhaust purification device 22 is, for example, a diesel engine oxidation catalytic converter diesel oxidation catalyst (DOC) that oxidizes components in particulate matter (PM). The exhaust purification device 22 may be a diesel particulate filter (DPF) that collects and then treats PM contained in the exhaust gas. The exhaust purification device 22 may be a selective catalytic reduction (SCR) that reduces nitrogen oxides (NOx) in the exhaust gas by using ammonia generated by urea hydrolysis.

The exhaust monitoring system 100 may include exhaust purification devices 22. For example, the exhaust monitoring system 100 may include three types of exhaust purification devices 22, namely, an oxidation catalyst for a diesel engine, a diesel particulate filter, and a selective reduction catalyst.

As shown in FIG. 2, the first sensor 24 is installed in a portion of the exhaust pipe 23 through which the exhaust gas that has passed through the exhaust purification device 22 passes. While the engine 21 is operating, the first sensor 24 detects the amount of NOx contained in the exhaust gas that has passed through the exhaust purification device 22. That is, the first sensor 24 detects the amount of NOx in the exhaust gas purified by the exhaust purification device 22.

As shown in FIG. 2, the second sensor 25 is installed in a portion of the exhaust pipe 23 through which the exhaust gas that has passed through the exhaust purification device 22 passes. While the engine 21 is operating, the second sensor 25 detects the amount of PM contained in the exhaust gas that has passed through the exhaust purification device 22. That is, the second sensor 25 detects the amount of PM in the exhaust gas purified by the exhaust purification device 22.

In FIG. 2, the first sensor 24 is arranged at a location closer to the exhaust purification device 22 than the second sensor 25. The second sensor 25 may be disposed at a location closer to the exhaust purification device 22 than the first sensor 24. Further, the first sensor 24 and the second sensor 25 may be arranged side by side in the exhaust pipe 23 such that the distance from the exhaust purification device 22 to the first sensor 24 and the distance from the exhaust purification device 22 to the second sensor 25 are the same.

The management device 12 is, for example, an electronic control device included in the vehicle 10. The management device 12 is connected to the first sensor 24 and the second sensor 25, and acquires detection values from the first sensor 24 and the second sensor 25. The management device 12 determines whether an abnormality has occurred in the components contained in the exhaust gas by acquiring the detection values from the first sensor 24 and the second sensor 25. A threshold is set in advance for the amount of NOx detected by the first sensor 24. Further, a threshold is also set in advance for the amount of PM detected by the second sensor 25. The management device 12 determines that an abnormality has occurred in a component contained in the exhaust gas when the detection value of at least one of the first sensor 24 and the second sensor 25 is greater than or equal to a threshold.

The management device 12 is connected to the display device 11 and the engine 21 so as to control the display device 11 and the engine 21. When determining that an abnormality has occurred in the component contained in the exhaust gas, the management device 12 controls the display device 11 and the engine 21 in accordance with the distance traveled by the vehicle 10 after determining that an abnormality has occurred.

Control of Display Device 11 and Engine 21 by Management Device 12

Figure 3:
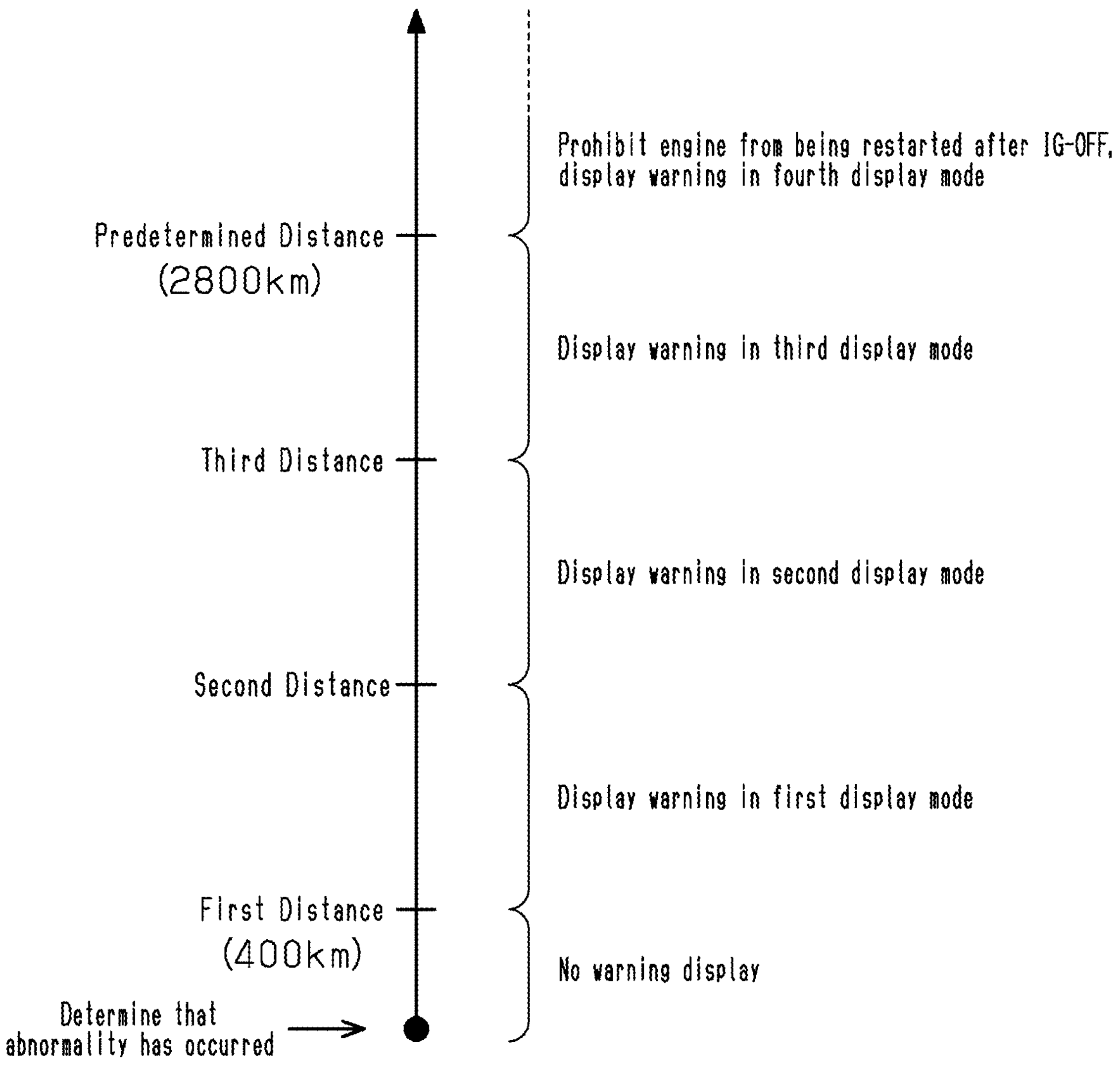
FIG. 3 is a diagram showing the transition of control according to the distance traveled by the vehicle by the exhaust monitoring system shown in FIG. 1.

FIG. 3 shows the distance traveled by the vehicle 10 after the management device 12 determines that an abnormality has occurred in the component contained in the exhaust gas. For example, the management device 12 calculates the distance traveled by the vehicle 10 from when it is determined that an abnormality has occurred, based on the number of rotations of the wheels of the vehicle 10.

In FIG. 3, the start point of the arrow indicates a point at which the management device 12 determines that an abnormality has occurred in the component contained in the exhaust gas. In FIG. 3, the distance traveled by the vehicle 10 increases as the distance from the start point indicated by the arrow increases in the direction indicated by the arrow.

In the exhaust monitoring system 100, a reference distance for the management device 12 to control the display device 11 and the engine 21 is set in advance. As shown in FIG. 3, in the exhaust monitoring system 100, a first distance, a second distance, a third distance, and a predetermined distance are set in advance as reference distances.

The longest of the reference distances is the predetermined distance. In the present embodiment, the predetermined distance is 2800 km. The first distance is less than the predetermined distance. In the present embodiment, the first distance is 400 km. The second distance is greater than the first distance and shorter than the predetermined distance. The third distance is greater than the second distance and shorter than the predetermined distance. In this manner, the reference distance increases in the order of the first distance, the second distance, the third distance, and the predetermined distance.

As shown in FIG. 3, when the distance traveled by the vehicle 10 becomes greater than or equal to the first distance after the management device 12 determines that an abnormality has occurred in the component contained in the exhaust gas, the management device 12 starts displaying a warning on the display device 11. The management device 12 does not display a warning on the display device 11 while the distance traveled by the vehicle 10 is less than the first distance. In this manner, even if the management device 12 determines that an abnormality has occurred in the component contained in the exhaust gas, the management device 12 does not immediately display a warning on the display device 11.

FIG. 4 shows an example of a warning display 30, which is a warning image displayed on the display device 11 by the management device 12. As shown in FIG. 4, the warning display 30 includes a distance display 31 and a message display 32.

The distance display 31 displays a drivable distance. The drivable distance is a distance from when the management device 12 determines that an abnormality has occurred in the component contained in the exhaust gas to when the traveled distance reaches the predetermined distance. The drivable distance becomes shorter as the distance traveled by the vehicle 10 from when the management device 12 determines that an abnormality has occurred in the component contained in the exhaust gas becomes longer. That is, the distance display 31 displays the drivable distance, which is a remaining distance until the distance traveled by the vehicle 10 reaches the predetermined distance from when the management device 12 determines that an abnormality is determined to have occurred in the component contained in the exhaust gas, while counting down the drivable distance.

The message display 32 displays a warning message for the user of the vehicle 10. The message displayed by the message display 32 may be an image instead of a text.

The warning has four stages of display modes from a first display mode to a fourth display mode. In the display mode of the four stages, the higher the stage, the stronger the repair of the vehicle 10 is prompted. The display modes of the four stages become higher in the order of the first display mode, the second display mode, the third display mode, and the fourth display mode from the lowest display mode.

For example, the color of the message changes according to the stage of the display mode. For example, as the level of the display mode becomes higher, the display frequency of the message becomes higher. For example, when the level of the display mode becomes higher, the message blinks. For example, when the stage of the display mode becomes higher, a sound is made together with a sentence or an image.

There are four stages of messages from a first stage to a fourth stage. The message changes to a message with a higher level as the level of the display mode becomes higher. The four level messages increase in level from the lowest level to the first level, the second level, the third level, and the fourth level. For example, in a message with four levels, the higher the level, the more strongly the content of the sentence changes to prompt repair.

As shown in FIG. 3, the management device 12 displays a warning in the first display mode on the display device 11 in a case in which the distance traveled from when it is determined that an abnormality has occurred in the component contained in the exhaust gas is greater than or equal to the first distance and less than the second distance.

FIG. 5 shows the types of warning display modes displayed on the display device 11 by the management device 12, and the description of the display content in the present embodiment for each type.

As shown in FIG. 5, in the warning of the first display mode, the management device 12 displays the drivable distance on the distance display 31. In the warning of the first display mode, the management device 12 displays the message of the first stage on the message display 32.

As shown in FIG. 3, the management device 12 displays a warning in the second display mode on the display device 11 when the distance traveled from when it is determined that an abnormality has occurred in the component contained in the exhaust gas is greater than or equal to the second distance and less than the third distance.

As shown in FIG. 5, in the warning of the second display mode, the management device 12 displays the drivable distance on the distance display 31. In addition, in the warning of the second display mode, the management device 12 displays the message of the second stage on the message display 32.

As shown in FIG. 3, the management device 12 displays a warning in the third display mode on the display device 11 when the distance traveled from when it is determined that an abnormality has occurred in the component contained in the exhaust gas is greater than or equal to the third distance and less than the predetermined distance.

As shown in FIG. 5, in the warning of the third display mode, the management device 12 displays the drivable distance on the distance display 31. In the warning of the third display mode, the management device 12 displays the message of the third stage on the message display 32.

When the distance traveled from when it is determined that an abnormality has occurred in the component contained in the exhaust gas becomes the predetermined distance or more, the drivable distance becomes zero. As shown in FIG. 3, when the drivable distance becomes zero, the management device 12 does not permit the restart of the engine 21 after the ignition switch is turned off (IG-OFF). That is, when the engine 21 is stopped in a state in which the drivable distance is zero, the management device 12 prohibits the engine 21 from being restarted and does not start the engine 21 even if an operation for starting the engine 21 is performed.

Further, as shown in FIG. 3, the management device 12 displays a warning in the fourth display mode on the display device 11 when the distance traveled from when it is determined that an abnormality has occurred in the component contained in the exhaust gas is greater than or equal to the predetermined distance.

As shown in FIG. 5, in the warning of the third display mode, the management device 12 displays the message of the fourth stage on the message display 32. For example, the management device 12 strongly prompts the user to repair the vehicle 10 by displaying, as the fourth stage message, a message indicating that the engine 21 cannot be restarted after the ignition switch of the vehicle 10 is turned off.

Processing Executed by Management Device 12

Figure 6:
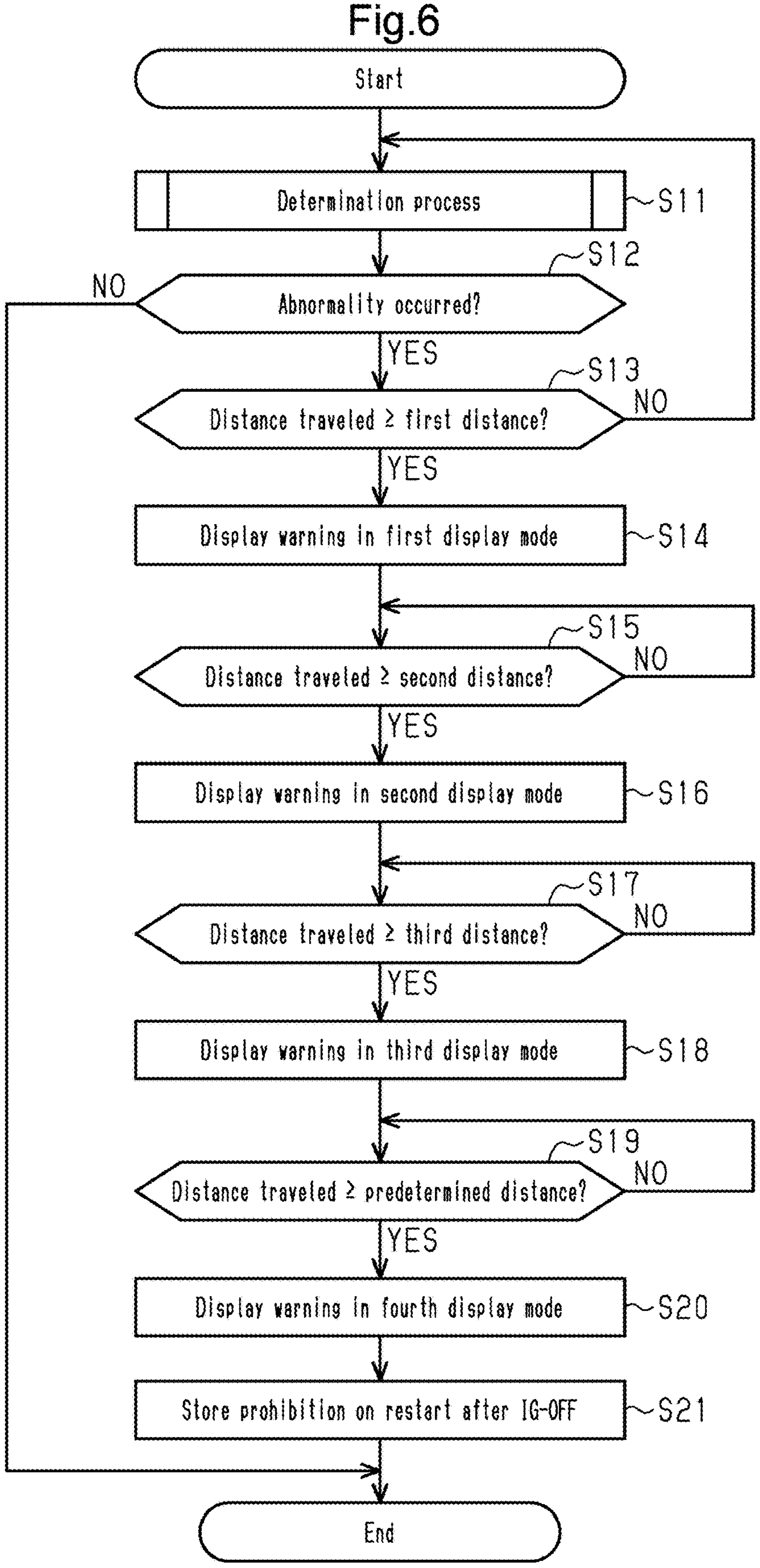
FIG. 6 is a flowchart showing a series of processes executed by the management device shown in FIG. 1.

FIG. 6 shows a series of processes executed by the management device 12 in the exhaust monitoring system 100. The management device 12 executes a series of processes illustrated in FIG. 6 when the engine 21 is operating.

In the process of step S11, the management device 12 executes a determination process. In the determination process, after acquiring the detection values from the first sensor 24 and the second sensor 25, the management device 12 determines whether there is an abnormality in the components contained in the exhaust gas based on the acquired detection values.

As described above, a threshold is set in advance for the amount of NOx detected by the first sensor 24. Further, a threshold is also set in advance for the amount of PM detected by the second sensor 25. The management device 12 determines that an abnormality has occurred in a component contained in the exhaust gas when the detection value of at least one of the first sensor 24 and the second sensor 25 is greater than or equal to the threshold. The management device 12 determines that an abnormality has not occurred in the components contained in the exhaust gas when the detection values of the first sensor 24 and the second sensor 25 are both less than the threshold.

In the process of the next step S12, the management device 12 determines whether an abnormality has occurred in the components contained in the exhaust gas based on the determination process of step S11.

When the management device 12 determines that there is no abnormality in the components contained in the exhaust gas based on the determination process of step S11 (step S12: NO), the management device 12 ends the series of processes shown in FIG. 6. When the management device 12 determines that an abnormality has occurred in the components contained in the exhaust gas based on the determination process in step S11 (step S12: YES), the management device 12 advances the process to step S13.

In the process of step S13, the management device 12 determines whether the distance traveled by the vehicle 10 from when it is determined that an abnormality has occurred in the components contained in the exhaust gas is greater than or equal to the first distance.

When the management device 12 determines that the distance traveled by the vehicle 10 is less than the first distance (step S13: NO), the management device 12 performs the processes of step S11 and step S12 again. That is, the management device 12 repeats the determination process and the process of checking the result of the determination process until the distance traveled by the vehicle 10 becomes greater than or equal to the first distance. When the management device 12 determines that there is no abnormality based on the result of the determination process performed while the distance traveled by the vehicle 10 is less than the first distance even after the management device 12 once determines that there is an abnormality in the component contained in the exhaust gas, the management device 12 ends the series of processes shown in FIG. 6.

When the management device 12 determines that the distance traveled by the vehicle 10 is greater than or equal to the first distance (step S13: YES), the management device 12 advances the process to step S14. In the process of step S14, the management device 12 displays a warning in the first display mode on the display device 11.

For example, after determining that the distance traveled by the vehicle 10 is greater than or equal to the first distance, the management device 12 starts the display in the first display mode after the engine 21 of the vehicle 10 is stopped and then restarted. The management device 12 may start the display in the first display mode immediately after determining that the distance traveled by the vehicle 10 is greater than or equal to the first distance.

In the process of the next step S15, the management device 12 determines whether the distance traveled by the vehicle 10 from when it is determined that an abnormality has occurred in the components contained in the exhaust gas is greater than or equal to the second distance.

When the management device 12 determines that the distance traveled by the vehicle 10 is less than the second distance (step S15: NO), the management device 12 repeats the process of step S15.

When the management device 12 determines that the distance traveled by the vehicle 10 is greater than or equal to the second distance (step S15: YES), the management device 12 advances the process to step S16. In the process of step S16, the management device 12 displays a warning in the second display mode on the display device 11.

For example, after determining that the distance traveled by the vehicle 10 is greater than or equal to the second distance, the management device 12 starts the display in the second display mode after the engine 21 of the vehicle 10 is stopped and then restarted. The management device 12 may start the display in the second display mode immediately after determining that the distance traveled by the vehicle 10 is greater than or equal to the second distance.

In the process of the next step S17, the management device 12 determines whether the distance traveled by the vehicle 10 from when it is determined that an abnormality has occurred in the components contained in the exhaust gas is greater than or equal to the third distance.

When the management device 12 determines that the distance traveled by the vehicle 10 is less than the third distance (step S17: NO), the management device 12 repeats the process of step S17.

When the management device 12 determines that the distance traveled by the vehicle 10 is greater than or equal to the third distance (step S17: YES), the management device 12 advances the process to step S18. In the process of step S18, the management device 12 displays a warning in the third display mode on the display device 11.

For example, after determining that the distance traveled by the vehicle 10 is greater than or equal to the third distance, the management device 12 starts the display in the third display mode after the engine 21 of the vehicle 10 is stopped and then restarted. The management device 12 may start the display in the third display mode immediately after determining that the distance traveled by the vehicle 10 is greater than or equal to the third distance.

In the process of the next step S19, the management device 12 determines whether the distance traveled by the vehicle 10 from when it is determined that an abnormality has occurred in the components contained in the exhaust gas is greater than or equal to the predetermined distance.

When the management device 12 determines that the distance traveled by the vehicle 10 is less than the predetermined distance (step S19: NO), the management device 12 repeats the process of step S19.

If the management device 12 determines that the distance traveled by the vehicle 10 is greater than or equal to the predetermined distance (step S19: YES), the management device 12 advances the process to step S20. In the process of step S20, the management device 12 displays a warning in the fourth display mode on the display device 11. The management device 12 starts the display in the fourth display mode immediately after determining that the distance traveled by the vehicle 10 is greater than or equal to the predetermined distance.

In the process of the next step S21, the management device 12 stores information indicating that the restart of the engine 21 is prohibited after the ignition switch of the vehicle 10 is turned off. The order in which the process of step S20 and the process of step S21 are executed may be reversed.

The management device 12 starts displaying a warning on the display device 11 in the processes subsequent to step S14. When the abnormality in the component contained in the exhaust gas is solved by repairing the vehicle 10, the exhaust monitoring system 100 clears the warning display and ends the series of processes shown in FIG. 6. For example, when the exhaust purification device 22, the first sensor 24, or the second sensor 25 is repaired, the exhaust monitoring system 100 clears the warning display and ends the series of processes shown in FIG. 6.

When the vehicle 10 is repaired with the warning in the first display mode displayed, the exhaust monitoring system 100 clears the warning in the first display mode and ends the series of processes shown in FIG. 6. When the vehicle 10 is repaired with the warning in the second display mode displayed, the exhaust monitoring system 100 clears the warning in the second display mode and ends the series of processes shown in FIG. 6. When the vehicle 10 is repaired with the warning of the third display mode displayed, the exhaust monitoring system 100 clears the warning of the third display mode and ends the series of processes shown in FIG. 6. When the vehicle 10 is repaired with the warning in the fourth display mode displayed, the exhaust monitoring system 100 clears the warning in the fourth display mode and ends the series of processes shown in FIG. 6.

Even if the exhaust monitoring system 100 stores that the restart of the engine 21 is prohibited in the process of step S21, the exhaust monitoring system 100 cancels the prohibition of the restart of the engine 21 when the abnormality in the components contained in the exhaust gas is solved by repairing the vehicle 10.

When the series of processes illustrated in FIG. 6 is ended as a result of repairing the vehicle 10, for example, the repairer of the vehicle 10 resets the settings of the management device 12 at the stage at which the vehicle 10 is repaired, and thus the series of processes illustrated in FIG. 6. The management device 12 may end the series of processes illustrated in FIG. 6 upon detecting that the vehicle 10 has been repaired.

Operation of Present Embodiment

The exhaust monitoring system 100 notifies the user of the vehicle 10 of the drivable distance when there is an abnormality in the amount of nitrogen oxides contained in exhaust gas. Then, the exhaust monitoring system 100 prevents the engine 21 from being restarted when the vehicle 10 continues to travel even if the vehicle 10 has not been repaired and the drivable distance becomes zero.

Advantages of Present Embodiment (1) The exhaust monitoring system 100 is configured to prompt the user to repair the vehicle 10 as soon as possible when there is an abnormality in the amount of nitrogen oxides contained in the exhaust gas. Further, when the user ignores the notification and continues to use the vehicle 10 without performing repair, the exhaust monitoring system 100 prevents the exhaust gas from being discharged from the vehicle 10 by preventing the engine 21 from being restarted.

(2) The exhaust monitoring system 100 includes the second sensor 25, which detects the amount of particulate matter contained in the exhaust gas that has passed through the exhaust purification device 22. In the exhaust monitoring system 100, the management device 12 determines that an abnormality has occurred also when the second sensor 25 detects particulate matter in the amount greater than or equal to the threshold.

The exhaust monitoring system 100 notifies the user of the vehicle 10 of the drivable distance when there is an abnormality in the amount of particulate matter contained in the exhaust gas. Then, the exhaust monitoring system 100 prevents the engine 21 from being restarted when the vehicle 10 continues to travel even if the vehicle 10 has not been repaired and the drivable distance becomes zero. This allows the exhaust monitoring system 100 to prompt the user to repair the vehicle 10 as soon as possible when the amount of the particulate matter contained in the exhaust gas is abnormal. Further, when the user ignores the notification and continues to use the vehicle 10 without performing repair, to the exhaust monitoring system 100 prevents the exhaust gas from being discharged from the vehicle 10 by preventing the engine 21 from being restarted.

(3) In the exhaust monitoring system 100, the first distance, which is less than the predetermined distance, is set in advance. In the exhaust monitoring system 100, the management device 12 is configured to start displaying the drivable distance on the display device 11 when the distance traveled becomes greater than or equal to the first distance while the abnormality remains unresolved.

The abnormality in the component of the exhaust gas detected by the sensor may be eliminated without repair. The exhaust monitoring system 100 does not immediately display the drivable distance when an abnormality is determined, but starts displaying the drivable distance when the abnormality is not eliminated even if the traveled distance after the determination becomes greater than or equal to the first distance. This allows the exhaust monitoring system 100 to prevent the notification of the drivable distance when the abnormality in the component of the exhaust gas is immediately eliminated.

(4) In the exhaust monitoring system 100, the first distance is 400 km, and the predetermined distance is 2800 km. This allows the exhaust monitoring system 100 to prohibit the restart of the engine 21 when the vehicle travels 2800 km or more after the abnormality in the components of the exhaust gas is determined.

(5) In the exhaust monitoring system 100, the second distance and the third distance are set in advance. The second distance is greater than the first distance and less than the predetermined distance. The third distance is greater than the second distance and less than the predetermined distance. In the exhaust monitoring system 100, the management device 12 displays a warning in the first display mode on the display device 11 in a case in which the distance traveled from when an abnormality is determined to have occurred is greater than or equal to the first distance and less than the second distance. In the exhaust monitoring system 100, the management device 12 displays a warning in the second display mode on the display device 11 in a case in which the distance traveled from when an abnormality is determined to have occurred is greater than or equal to the second distance and less than the third distance. The second display mode is different from the first display mode. In the exhaust monitoring system 100, the management device 12 displays a warning in the third display mode on the display device 11 in a case in which the distance traveled from when an abnormality is determined to have occurred is greater than or equal to the third distance and less than the predetermined distance. The third display mode is different from the first display mode and the second display mode. In the exhaust monitoring system 100, the management device 12 displays a warning in the fourth display mode on the display device 11 in a case in which the distance traveled from when an abnormality is determined to have occurred is greater than or equal to the predetermined distance. The fourth display mode is different from the first display mode, the second display mode, and the third display mode.

The exhaust monitoring system 100 presents the information to be displayed on the display device 11 to the user while changing the information in a stepwise manner when the user ignores the warning and continues to use the vehicle 10 without repairing the vehicle 10 after determining the abnormality in the component of the exhaust gas. Thus, the exhaust monitoring system 100 can notify a user who does not repair the vehicle 10 that the drivable distance is shortened in a stepwise manner.

Modifications

The present embodiments may be modified as follows. The present embodiment and the following modifications can be combined as long as they remain technically consistent with each other.

In the embodiment described above, the engine 21 is a diesel engine. The engine 21 may be a gasoline engine.

In the above-described embodiment, the DOC, the DPF, and the SCR are exemplified as the exhaust purification device 22. The exhaust purification device 22 that can be included in the exhaust monitoring system 100 is not limited to the device exemplified above. For example, the exhaust purification device 22 may be a gasoline particulate filter (GPF) that collects PM in exhaust gas.

In the above-described embodiment, the exhaust monitoring system 100 includes the second sensor 25. The exhaust monitoring system 100 may not include the second sensor 25. In this case, the management device 12 does not determine whether the component contained in the exhaust gas is abnormal based on the amount of PM contained in exhaust gas.

In the above-described embodiment, the first distance is set in advance. In the exhaust monitoring system 100, the first distance may not be determined in advance. In this case, when it is determined that an abnormality has occurred in the component contained in the exhaust gas, the management device 12 displays a warning on the display device 11 without waiting for the distance traveled by the vehicle 10 to become greater than or equal to the first distance. In this case, the predetermined distance may be 2400 km instead of 2800 km.

In the above-described embodiment, the management device 12 does not display a warning on the display device 11 while the distance traveled by the vehicle 10 is less than the first distance. The management device 12 may display a warning on the display device 11 when the distance traveled by the vehicle 10 is less than the first distance.

In the above-described embodiment, the first distance is 400 km. The first distance may not be 400 km. Further, in the above-described embodiment, the predetermined distance is 2800 km. The predetermined distance may not be 2800 km.

In the embodiment described above, the second distance and the third distance are set. The second distance and the third distance may not be determined.

In the above-described embodiment, the management device 12 changes the mode of the warning display 30 to the first display mode, the second display mode, the third display mode, and the fourth display mode as the distance traveled by the vehicle 10 from when it is determined that an abnormality has occurred increases. The management device 12 may not change the mode of the warning display 30.

Further, the types of modes of the warning display 30 are not limited to the four types described above. The number of types of modes of the warning display 30 may be three or less or five or more.

In the above-described embodiment, the management device 12 changes the message in stages in accordance with the stage of the display mode. The management device 12 may not change the message.

In the above-described embodiment, there are messages up to the fourth stage. The maximum value of the level of the message may be equal to or lower than the third level or may be equal to or higher than the fifth level.

In the exhaust monitoring system 100, the mode of the warning displayed on the warning display 30 by the display device 11 is not limited to the above-described embodiment. For example, the display device 11 may display the drivable distance on the distance display 31, but may not display a message on the message display 32.

The management device 12 is not limited to a device that includes a CPU and a memory and executes software processing. For example, the management device 12 may include a dedicated hardware circuit such as an application specific integrated circuit (ASIC) that performs hardware processing on at least a part of the software processing in the above-described embodiment. That is, the management device 12 may include a processing circuit (processing circuitry) having any one of the following configurations (a) A processing circuit (processing circuitry) including one or more processing devices that execute all of the above processes in accordance with a program and one or more program storage devices such as a ROM that stores the program. (b) A processing circuit (processing circuitry) including one or more processing devices and one or more program storage devices that execute a part of the processing according to a program, and one or more dedicated hardware circuits that execute the remaining processing. (c) A processing circuit (processing circuitry) comprising one or more dedicated hardware circuits for performing all of the above processes.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An exhaust monitoring system for a vehicle including an engine, the exhaust monitoring system comprising:

an exhaust purification device configured to purify exhaust gas discharged from the engine;

a first sensor configured to detect an amount of nitrogen oxide contained in the exhaust gas that has passed through the exhaust purification device;

a display device configured to present information to a user of the vehicle; and a management device, wherein the management device is configured to:

determine that an abnormality has occurred in a component contained in the exhaust gas when the first sensor detects the nitrogen oxide in an amount greater than or equal to a threshold;

display a drivable distance on the display device, wherein the drivable distance is a remaining distance until a distance traveled from when the abnormality is determined to have occurred reaches a predetermined distance; and when the engine is stopped in a state in which the drivable distance is zero, prohibit the engine from being started even if an operation for starting the engine is performed.

2. The exhaust monitoring system according to claim 1, further comprising a second sensor configured to detect an amount of particulate matter contained in the exhaust gas that has passed through the exhaust purification device, wherein the management device is configured to determine that the abnormality has occurred also when the second sensor detects the particulate matter in the amount greater than or equal to a threshold.

3. The exhaust monitoring system according to claim 1, wherein a first distance that is less than the predetermined distance is determined in advance, and the management device is configured to start displaying the drivable distance on the display device when the distance traveled becomes greater than or equal to the first distance while the abnormality remains unresolved.

4. The exhaust monitoring system according to claim 3, wherein the first distance is 400 km, and the predetermined distance is 2800 km.

5. The exhaust monitoring system according to claim 3, wherein a second distance and a third distance are defined in advance, wherein the second distance is greater than the first distance and less than the predetermined distance, and the third distance is greater than the second distance and less than the predetermined distance, and the management device is configured to:

display a warning in a first display mode on the display device in a case in which the distance traveled from when the abnormality is determined to have occurred is greater than or equal to the first distance and less than the second distance, display a warning in a second display mode on the display device in a case in which the distance traveled from when the abnormality is determined to have occurred is greater than or equal to the second distance and less than the third distance, wherein the second display mode is different from the first display mode;

display a warning in a third display mode on the display device in a case in which the distance traveled from when the abnormality is determined to have occurred is greater than or equal to the third distance and less than the predetermined distance, wherein the third display mode is different from the first display mode and the second display mode; and display a warning in a fourth display mode on the display device in a case in which the distance traveled from when the abnormality is determined to have occurred is greater than or equal to the predetermined distance, wherein the fourth display mode is different from the first display mode, the second display mode, and the third display mode.

6. An exhaust monitoring method for a vehicle including an engine, wherein the engine and an exhaust monitoring system, wherein the exhaust monitoring system includes:

an exhaust purification device configured to purify exhaust gas discharged from the engine;

a first sensor configured to detect an amount of nitrogen oxide contained in the exhaust gas that has passed through the exhaust purification device;

a display device configured to present information to a user of the vehicle; and a management device, and the method comprises:

determining that an abnormality has occurred in a component contained in the exhaust gas when the first sensor detects the nitrogen oxide in an amount greater than or equal to a threshold;

displaying a drivable distance on the display device, wherein the drivable distance is a remaining distance until a distance traveled from when the abnormality is determined to have occurred reaches a predetermined distance; and when the engine is stopped in a state in which the drivable distance is zero, prohibiting the engine from being started even if an operation for starting the engine is performed.

* * * * *